United States Patent Office 2,958,669
Patented Nov. 1, 1960

2,958,669

DRY, FREE-FLOWING, PIGMENTED POLYVINYL CHLORIDE COMPOSITION AND METHOD OF MAKING

Ernest D. Hoffmann, Baltimore, Md., assignor to Western Electric Company, Incorporated, New York, N.Y., a corporation of New York No Drawing. Filed Jan. 30, 1957, Ser. No. 637,080

10 Claims. (Cl. 260—31.8)

This invention relates to pigmented compositions and methods of making the same, and more particularly to pigmented compositions suitable for use in plastic mixes and methods of making such compositions.

The production of plastic masses containing dispersed pigment for incorporation into large batches of neutral colored plastic for coloring purposes is not new. Such dispersions or pigmented compositions are known to the industry as color master batches or concentrates. Such master batches are used by many manufacturers of colored resinous materials for convenience and economy, since by the use of a master batched color the need for extensive and costly milling of pigment to incorporate it into the resinous material is obviated. Further, such color master batches are much easier to handle in the plant because they cause far less dust than does an uncompounded pigment. The use of properly compounded master batches affords the user a degree of uniformity and quality of pigmentation of the final product which is superior to that obtained by the preparation of these materials from the raw pigment.

Heretofore it has been necessary in the production of color master batches to submit the pigment and resinous material along with other materials to prolonged and expensive heating and mechanical working to achieve a dispersion of satisfactory quality. In addition to the difficulties mentioned, the degree of dispersion obtained by these methods, while satisfactory for some applications, very often leave much to be desired when a very fine degree of dispersion is required. Another major disadvantage in producing the known color master batches lies in the character of the finished product. The product generally obtained comprises heat-fused lumps of colored resin of extremely hard character and a relatively difficult solubility due to the unavoidable heating of the resin in the dispersion operation.

It has been found that pigmented dispersions of extremely high quality can be prepared in an efficient manner with simple inexpensive mixing of a pigment and a solid resin by the use of a novel and special type of liquid dispersion and mixing. The pigmented dispersion formed in these procedures have a high chromaticity, and when used to color resinous masses a high percentage of the strength of the pigment employed is utilized. Resinous composition prepared with these pigmented dispersions are uniform and highly colored, and have good electrical and physical properties. They also are produced in the form of a dry, free-flowing powder which may be incorporated readily into large masses of resinous materials to color them.

An object of the invention is to provide new and improved pigmented compositions and new and improved methods of making them.

A further object of the invention is to provide new and improved pigmented compositions suitable for use in plastics mixes and new and improved methods of making such compositions.

Another object of the invention is the production of improved pigmented compositions or master color batches and methods involving only simple, inexpensive mixing steps for their preparation.

Still another object of the invention is the production of pigmented resinous materials containing coloring material in a state of extremely fine and uniform dispersion having a high chromaticity.

Other objects and features of the invention will be apparent from the detailed description of the specification which follows.

In accordance with these objects, the invention involves the dispersion of finely divided pigment on granular, dry blend resins for obtaining a permanent dispersion of the pigment on the surface of the resin granules. These dispersions are made from dry, finely divided pigments, as opposed to filter cakes or wet pulp pigments, which is highly advantageous because many pigments cannot be precipitated and cannot be made into dispersions in other well-known processes.

Pigmented compositions illustrating certain features of the invention may comprise dry, free-flowing plastic granules having finely divided pigment dispersed upon and adhering to the surfaces of the granules.

A method of making pigmented compositions illustrating certain features of the invention may comprise mixing and heating plastic granules with finely divided pigment and a plasticizer for the plastic whereby the plasticizer is absorbed and the pigment is dispersed uniformly upon the plastic and is caused to adhere thereupon.

One method embodying the present invention, and by means of which pigmented compositions embodying the invention may be prepared, comprises preparing a paste by mixing a dry pigment with a suitable plasticizer for the resin in which the color master batch is to be ultimately employed. The resulting paste is added slowly to a dry blend resin in powder form, whereby the particles of resin absorb the plasticizer and the resin particles are coated with the pigment to produce dry, granular, free-flowing, dust-free particles which may later be included in a dry blend resin compound to color it.

An effective pigmented dispersion may be obtained by mixing a suitable pigment with a dry blend resin in an internal shear type mixer at room temperature and adding slowly thereto a suitable plasticizer for the resin to form a mass consistency conducive to high shear mixing. The mixture at this stage is called a mastic mix. The mastic mix is mixed until the desired degree of dispersion is attained. The mastic mix is then heated and mixed until the mass breaks into individual particle form and becomes a dry, free-flowing dispersion. The dispersion is then cooled and screened, and packaged, if desired.

*Example 1*

| | Percent |
|---|---|
| PVC resin | 47.2 |
| Di (2 ethylhexyl) phthalate | 32.8 |
| Electra Red pigment | 20.0 |
| | 100.0 |

Ten pounds of pigment together with the proportionate amount of PVC resin indicated above, are placed into a 25 gallon electrically heated Universal kneading and mixing machine with sigma type blades. These are allowed to blend with no heat for a period of 5 minutes. All of the di (2 ethylhexyl) phthalate is then added over a period of 5 minutes and heat is applied to the jacket at this time. The batch will assume properties conducive to high shear. The mixture is mixed for approximately 35 minutes at which time the mass will break at a batch temperature of approximately 195° F. In approximately 5 to 10 minutes the batch will reach a temperature in excess of 210° F. which will render the batch dry for removal. The batch is removed from the mixer, cooled with agitation, screened to remove all lumps in size 20 mesh or greater, and packaged.

*Example 2*

| | Percent |
|---|---|
| PVC resin | 32.0 |
| Di (2 ethylhexyl) phthalate | 48.0 |
| Channel black | 20.0 |
| | 100.0 |

This composition may be made by the method described in connection with Example 1.

These methods produce pigmented dispersion comprising plasticized, virgin resin particles having irregular surfaces coated with a thin layer of wetted pigment. Such color master batches are free-flowing and may be handled readily with little or no transfer of pigment to objects contacted thereby. These products result in better utilization of the pigmenting powers of the pigments than can be obtained through the use of undispersed pigments, and are composed of all virgin materials without any significant detrimental heat history.

Different approaches may be used to effect the dispersion of the pigment upon the resin granules depending on whether or not the pigment is considered to contain agglomerates when received. Adhesion of the pigment to the resin particles is accomplished in either case by first making the ingredients into a mastic mix and mixing and working the mix in a high shear internal type mixer or other appropriate means until the desired degree of dispersion is attained.

When the dry pigment is considered to be unagglomerated or is essentially composed of prime particles, the resin and pigment are put into a heat jacketed mixer and mixed until a suitable mixture is attained. Mineral process oil, which is not absorbed by the resin but is absorbed by the pigment, and plasticizer is added slowly to the mixture of resin and pigment and the material is mixed until mastic consistency conducive to high shear is obtained. Heat is then added to the mastic mix and when the temperature of the materials has reached the proper value, the mass will break and leave the finished product in the original grainy form of the resin. If the product is to be packaged, it should be cooled prior to packaging to avoid packing in the containers.

When the pigment to be used is known to contain agglomerates, as received in the dry form, a paste grind may be made of the pigment by adding plasticizer, or plasticizer and process oil, thereto. This paste is then added slowly to the resin in a high shear type mixer and the procedure is carried on as described above.

To help insure that the process oil is absorbed by the pigment alone and not absorbed by the resin, the pigment and process oil may be mixed in an internal type mixer until an even mixture is obtained, and the plasticizer may then be added to this mixture to form a paste. When the paste is sufficiently mixed, it is introduced slowly into another internal type mixer containing a dry blend resin and subjected to high shear mixing. After further mixing to form a uniform mixture, heat is applied. When this mixture achieves a suitable temperature, depending on the ingredients used, the mixture will break and result in a dry, free-flowing dispersion.

It is possible to eliminate the separate mixing step required to disperse the dry pigment in the process oil and the plasticizer to form a paste, which is later added to the resin to form the dispersion. In order to accomplish this end, the dry pigment is added directly to a high shear, internal type mixer and the plasticizer and process oil are added slowly to form a mix of stiff consistency which is conducive to effective mixing action. When the pigment has been sufficiently mixed, the dry blend resin is added thereto and the mixing is continued until a mastic mix is produced. Heat is then applied to the mixer and the mixing is continued. The mix subsequently will break and result in a dry, free-flowing dispersion. The advantage of this method is that the separate grinding step of the pigment is eliminated and the resin particles are subjected to a minimum shearing action so as to cause little or no physical breaking of the resin particles. Heating the resulting product at a suitable temperature will insure that it will become dry and stable.

To help guard against absorption of the process oil by the resin, the resin and pigment may be mixed in an internal type mixer, to form a uniform mixture of the resin and pigment, after which the light process oil is added. After further mixing to obtain a uniform mixture of the pigment, resin and process oil, the plasticizer is added to form a mastic mix conducive to high shearing action. Heat is then applied and the mix is further mixed until the mass breaks to form a dry, free-flowing dispersion. This mixture is cooled by appropriate means and later packaged, if desired.

The purpose of the addition of the process oil to the mixture of resin and pigment is to allow process oil to be preferentially absorbed by the pigment. This will reduce the possibility of the adsorption of the oil on the resin and will leave the majority of the plasticizer available for the resin. The pigment will absorb the process oil and the plasticizer readily, whereas the resin has little affinity for the process oil. One great advantage of the use of process oil is that the oil is very inexpensive as compared to the price of plasticizer, and it acts as a lubricant for the resin if the finished compound is processed.

Another method, which will insure that the process oil be absorbed by the pigment as opposed to the resin, may be carried out by placing the pigment into an internal type mixer to which the process oil is added. After a uniform mixture of the process oil and pigment has been attained, the resin is added to the mixture. When the mixture of the process oil, pigment and resin has become uniform, the plasticizer is added slowly to form a mastic mix conducive to high shear action. Heat is then applied to the mass and the mixture is mixed further until the mass breaks to form a dry, free-flowing dispersion. The mixture is removed from the mixer and cooled. This method has the advantages that the resin particles are submitted to a minimum shear action prior to the actual dispersion of the pigment thereon, and only one mixing operation is needed.

*Example 3*

| | Percent |
|---|---|
| PVC resin (Geon 101EP—B. F. Goodrich chemical) | 47.2 |
| Di (2 ethylhexyl) phthalate | 28.2 |
| Light process oil (Gulf 561 oil) | 4.6 |
| Electra Red pigment (Harmon Color Division, B. F. Goodrich) | 20.0 |
| | 100.0 |

Into a 25 gallon electrically heated Universal kneading and mixing machine with sigma type blades, place 10 pounds of Electra Red (red pyrazolone) pigment. Mixing is begun and 2.3 pounds of light process oil are added slowly over a period of approximately 4 minutes. This mixture is mixed an additional 3 minutes. The mixer is then stopped and 23.6 pounds of PVC resin are added and allowed to blend for a period of 5 minutes. Heat totaling 9.6 kilowatts is applied to the jacket. 14.1 pounds of di (2 ethylhexyl) phthalate are added over a period of 5 minutes, at the end of which time a high shear mastic mix has been formed. The temperature of the mix at this time will be slightly in excess of 125° F. All of the ingredients have been added and mixing is continued under a condition of high shear for approximately 26 to 31 minutes. The mass at this time will be observed to break into a relatively free-flowing dispersion. Jacket temperature at this point is held at 225° F., and mixing is continued for a period of up to 5 minutes, at which time the material appears only very slightly damp. The batch temperature is approximately 195° F. The batch is removed from the mixer, cooled with agitation, and screened to remove all lumps sized 20 mesh or greater which are added with the resin to a succeeding batch.

*Example 4*

| | Percent |
|---|---|
| PVC resin | 21.4 |
| Butyl benzyl phthalate | 22.1 |
| Light process oil | 6.5 |
| Iron oxide brown pigment | 50.0 |
| | 100.0 |

In accordance with the general procedure outlined in Example 3, 25 pounds of a ferro-ferric iron oxide brown are placed in the previously described mixer. The mixing cycle is commenced with the slow addition of 3.25 pounds of light process oil. After approximately 7 minutes, the mixer is stopped and a charge of 10.7 pounds of PVC resin is added. Heat is applied to the jacket and mixing is continued for 5 minutes. 11.05 pounds of butyl benzyl phthalate are added slowly at this time at a rate of approximately 2 pounds per minute. As soon as the batch has pulled into a mass of high shear properties, the addition of plasticizer is temporarily discontinued for approximately 20 minutes to assure a period of vigorous kneading and thorough dispersion of the iron oxide pigment. Should it seem necessary, small increments of plasticizer may be added during this period to maintain a suitable working mass. Addition of butyl benzyl phthalate should be concluded and mixing continued for approximately 11 to 16 minutes until the batch breaks. The jacket temperature should be approximately 225° F. and the batch temperature should be between 175° and 200° F. The final steps are identical to those of Example 3.

*Example 5*

| | Percent |
|---|---|
| PVC resin | 18.33 |
| Di (2 ethylhexyl) phthalate | 20.42 |
| Light process oil | 11.25 |
| Titanium dioxide, rutile | 33.46 |
| Iron oxide red | 15.63 |
| Channel black | .91 |
| | 100.00 |

The steps involved in making this composition are identical to those employed in Examples 3 and 4.

*Example 6*

| | Percent |
|---|---|
| PVC resin | 38.78 |
| Di (2 ethylhexyl) phthalate | 32.25 |
| Light process oil | 12.97 |
| Channel black | 16.00 |
| | 100.00 |

The steps involved in making this composition are identical to those employed in Examples 3 and 4.

These dispersions are composed of dry pigment, a PVC plasticizer, and dry blend type PVC resin, with or without a suitable oil. The final product consists of dispersed, wetted pigment smeared on the resin particle surfaces. The completed dispersion is dry to the touch, will not transfer pigment to objects contacted under normal handling conditions, and possesses all the handling characteristics of normal, dry blend compounds.

In many of the above-proposed methods for making color dispersions, a diluent can be introduced into the system as a processing aid. The diluent may be introduced into the materials at any desirable time during each of the methods but preferably after the oil has been added. In order to achieve the best efficiency of the diluent it is preferably added after all the other ingredients since some of the diluent may be volatilized off prematurely. The diluent will help to increase the total proportional solids in the final dispersion by permitting sufficient liquids to be present under the mixing conditions to form a mastic mix. However, upon reaching the break temperature of the mass, the diluent will be volatilized off. Therefore, the diluent to be used must be completely volatilized at least at the maximum temperature to be employed during the mixing operation. However, it is preferable that a diluent be used which will volatilize at a temperature at or below the break temperature of the mixture in which it is to be used.

*Example 7*

| | Percent |
|---|---|
| PVC resin | 40 |
| Santicizer 160 (butyl benzyl phthalate) | 40 |
| Channel black | 20 |
| | 100 |
| "Benzo-sol" (volatilized) | 12 |

Ten pounds of channel black, together with 17 pounds of Santicizer 160 are placed in a previously described high shear internal type mixer. These are mixed for a period of 10 minutes. Heat is applied to the jacket of the mixer to obtain 150° F. The remaining 3 pounds of Santicizer 160 are added slowly to maintain a stiff mastic mix. Dispersion is continued for 10 minutes, and 20 pounds of PVC resin are added to the mixture. Additional heat is applied to the jacket to obtain 200° F. Six pounds of Benzo-sol (aliphatic solvent with an initial boiling point of approximately 150° F. and a dry point of approximately 180° to 185° F.) are added to pull the batch together. The mixer is ventilated and the diluent is volatilized. The batch will not break sharply but will gradually become drier and finally free flowing. Mixing is continued until the batch temperature has been established at 200° and smell of diluent is no longer evident. The batch is removed, cooled with agitation, screened to minus 20 mesh and packaged.

*Example 8*

| | Percent |
|---|---|
| PVC resin | 47.1 |
| Santicizer 160 (butyl benzyl phthalate) | 32.85 |
| Electra Red pigment | 20.05 |
| | 100.00 |
| Benzo-sol (volatilized) | 7.8 |

A paste comprised of the following is ground over a standard 3 roll paint mill:

| | Percent |
|---|---|
| Electra Red | 33.0 |
| Santicizer | 54.2 |
| Benzo-sol | 12.8 |
| | 100.0 |

34.5 pounds of Geon 101 E.P. (PVC resin) are placed in the previously described mixer and are mixed with a jacket temperature of 150° F. for approximately 10 minutes. 44.5 pounds of paste, prepared as directed above, are added slowly over a period of 5 minutes. More heat is applied to the jacket to obtain 200° F. The mixer is ventilated and the diluent is volatilized. Blending is continued until the temperature of the mixture has reached 200° F. and smell of diluent is no longer present. The batch, which will be free-flowing and dry, is removed from the mixer, cooled with agitation, and screened, returning all lumps greater than 20 mesh to a succeeding batch.

Example 9

|  | Percent |
|---|---|
| PVC resin | 45.42 |
| DOP (di(2 ethylhexyl) phthalate) | 27.14 |
| Light process oil | 4.44 |
| Electra Red pigment | 23.00 |
|  | 100.00 |
| Benzo-sol (volatilized) | 10.00 |

Place 11.5 pounds of pigment in an internal type mixer and start mixing. Add 2.22 pounds of light process oil slowly to the mix. After approximately 7 minutes, add 22.71 pounds PVC resin and apply heat to the jacket of the mixer to obtain 200° F. Add 13.57 pounds of DOP slowly and mix for approximately 5 minutes, then add 5 pounds of Benzo-sol. Mixing should be continued for approximately 33 minutes, under a condition of high shear with ventilation and until the mass becomes dry and the smell of Benzo-sol is not evident. More heat is applied to establish a jacket temperature of 225° F. and mixing is continued without ventilation for approximately 5 minutes. The batch, now free flowing, is removed from the mixer, cooled with agitation and screened. Lumps, sized 20 mesh or greater, are added with the resin to a succeeding batch.

These dispersions are made in a high shear internal type mixer or other appropriate apparatus which will disperse and smear the pigment on the resin surface. The pigment coating will adhere to or be held on the irregular resin surface both physically and as a result of the driving force created by the unsatisfied portion of the oil and plasticizer absorption value of the pigment or the plasticizer absorption properties of the resin, or the plasticizer absorption properties of both the pigment and the resin.

It should be understood that the examples of the above methods are described as having heat applied prior to the time a mastic mix is formed, because of the particular heating equipment which was utilized in formulating these examples. It is, however, more desirable in most cases, for reasons which are obvious, to apply heat only after a mastic mix has been formed and the desirable degree of dispersion has been attained.

There are several basic properties which should be determined before a satisfactory dispersion can be made. The amount of each ingredient to be used is based on the formulation to which the dispersion will be added and the percentage of pigment desired. It is important to have the flux temperature or melting point of the dispersion the same or lower than that of the base mix to which it is to be added. This is necessary to insure a uniform distribution of color in the compound to which the dispersion is added after the base compound and the dispersion have been fluxed or melted. Too high a dispersion melting point can result in unincorporated dispersion lumps in the finished compound. To insure that the dispersion will have the proper flux temperature, the amount of plasticizer available to the resin in the dispersion should be the same as or greater than the amount available to the resin in the base compound. If the efficiency of the particular plasticizer used in the dispersion is not the same as that of the particular plasticizer used in the base compound, then a correction factor should be employed to determine the amount of plasticizer to be used in the dispersion to give the desired flux temperature.

The absorption values of both the resin and pigment for the plasticizer and oil should be determined in each case by standard ASTM methods. This information is necessary in determining the lower limit of the total quantity of liquids (oil and plasticizer) to be used in the dispersion. The total quantity of liquids should be sufficient at room temperature or the temperature which the material is subjected during the initial mixing cycle to fully wet the resin and pigment plus a small factor necessary to create a mastic mix conducive to high shear. This factor can readily be determined in each case by slowly adding liquid beyond the predetermined absorption values of the resin and pigment until a mastic consistency has been reached.

The total mount of liquid, i.e., plasticizer, or oil, or both, should be such that a deficiency exists in the absorption value of the pigment or of the resin, or of both the pigment and the resin, when the dispersion is completed. This deficiency will be created when heat is applied to the mastic mix to cause it to break after the desired degree of dispersion and smearing on the resin has been attained. The temperatures at which the mix breaks will vary depending on the properties of the plasticizer and resin used. The plasticizer will be taken into the resin rapidly when heat is applied, leaving the oil in some cases, and a small amount of plasticizer, with the pigment. Since the oil to be used should not be absorbed readily by the resin, the oil held within the resin is negligible. The mixing time employed should be long enough to insure that the desired degree of dispersion has been attained.

Care should be taken to avoid the use of an excessive amount of plasticizer since with an excess of plasticizer the resulting flux temperature of the mixture may be below the break temperature thereof which is undesirable. However, if the amount of liquid used is below the amount which will be absorbed by the solids at the temperature to which the mixture is subjected during the initial mixing cycle, a mastic mix will not occur.

Dispersions utilizing applicant's invention have a more uniform distribution of color in dry blend resin compounds than can generally be attained through the use of prefluxed color concentrates, and these dispersions are composed of all virgin materials. Prefluxed color concentrates possess a heat history, which defeats one of the prime reasons for using a dry blend resin compound. However, unlike dry pigments, wet ground, or flushed colors, these dispersions may be handled freely without transfer of pigment to objects contacted thereby. Composite colors can be made using the methods of the present invention, such as, brown which is composed of red, black and orange, which cannot be made if the dispersion method is dependent on precipitated pigments or flushed colors.

All dry blend type resins which are plasticizable under the conditions to which they are subjected during the dispersion operations described hereinabove are suitable for use in practicing the invention. Among these are the polyvinyl chloride resins. Some of the resins which may be employed are Geon 101EP and 103EP, made by B. F. Goodrich Chemical Company; PVC–111–4 and PVC–100–4, made by Dow Chemical Company; DB–80V, DB–90V and EDB–90V, made by Goodyear Tire and Rubber Company; PVC–50, made by Diamond Alkali Company; Opalon 300 and 300 FM, made by Monsanto Chemical Company, Plastics Division; Marvinol VR–22, 21, 24, 30, made by Naugatuck Chemical Company; Exon 500, made by Firestone Tire & Rubber Company, and Vinylite QYSQ, made by Bakelite Company.

All pigments that can be wetted and dispersed in the oil or resin plasticizer, or other liquids used, and do not have a detrimental effect on the finished resin compound under the condition to which it will be subjected may be used in the above-mentioned methods of the present invention.

All solvating type plasticizers for dry blend type resins, or mixtures thereof, and in general all esters of phthalic anhydride that solvate the resin under the conditions at which the dispersion is made and all other solvating type resin plasticizers, such as di(2-ethylhexyl) phthalate, butyl benzyl phthalate, octyl diphenyl phosphate, tricresyl phosphate, didecyl phthalate, n-octyl phthalate, n-decyl phthalate, and n-octyl n-decyl phthalate, may be used in any of the above-described methods to produce pigmented compositions embodying the present invention.

All oils which will wet the pigment, are compatible with the plasticizer used, and are not readily absorbed by the resin at room temperature, or at the final mix temperature, may be used. The oil should be stable under the finished compound processing conditions and should not react with other ingredients to cause degradation of the finished compound. Some suitable materials are saturated vegetable oils, castor oil, palm oil, liquid hydrocarbon resins, polyalkalene glycols, and pure petroleum oils, such as Gulf #561, made by the Gulf Oil Corporation; Shell Carnea #21, made by the Shell Oil Company; Mobil Oil and S/V Process Oil 908, made by the Socony Mobil Oil Company, and Sun #591 Process Oil, made by the Sun Oil Company. For electrical purposes, the mineral oils have proven to be very satisfactory. These oils are comparatively low cost, pound-volume-wise, and are available readily.

Some suitable diluents which will volatilize off at the maximum temperature to be employed during the mixing operation of the dispersions are pentane, isopentane, hexane, isohexane, benzene, textile spirits E-1, made by American Mineral Spirits, and Benzo-sol, made by the Shell Oil Company, Chemical Division.

It is to be understood that the above-described pigmented compositions and methods of making them are simply illustrative of the principles of the invention. Numerous other compositions and methods may be devised by those skilled in the art which will embody the principles of the invention and fall within the spirit and scope thereof.

What is claimed is:

1. The method of making dry, free-flowing, pigmented polyvinyl chloride granular compositions, which comprises forming a stiff mastic mix conducive to internal shearing and working containing polyvinyl chloride granules having irregular surfaces, dry powdered pigment and a liquid solvating plasticizer for the polyvinyl chloride granules, which plasticizer will wet the pigment and be absorbed partially thereby; causing high shear mixing of the mastic mix by vigorous kneading and working thereof until a desired degree of dispersion and smearing of the pigment particles on the polyvinyl chloride granules is obtained; and heating the mastic mix to a temperature below the melting point of the composition while mixing of the mastic mix until the plasticizer is absorbed by both the polyvinyl chloride granules and the pigment, so that particles of the pigment are dispersed upon and are caused to adhere firmly to the irregular surfaces of the polyvinyl chloride granules and the granules become dry and free flowing; the quantity of plasticizer being from approximately 69 percent to approximately 150 percent by weight of the polyvinyl chloride granules and being sufficient to form the stiff mastic mix but less than that which could be absorbed by the polyvinyl chloride granules plus the pigment, and the quantity of the pigment being from approximately 41 percent to approximately 273 percent by weight of the polyvinyl chloride granules.

2. A dry, free-flowing, pigmented polyvinyl chloride granular composition produced by the process of claim 1.

3. The method of making dry, free-flowing, pigmented polyvinyl chloride granular compositions, which comprises forming a stiff mastic mix conducive to internal shearing and working containing polyvinyl chloride granules having irregular surfaces, dry powdered pigment, a mineral oil which is not absorbable by the polyvinyl chloride granules but will wet the pigment and be absorbed thereby, and a liquid solvating plasticizer for the polyvinyl chloride granules, which plasticizer will wet the pigment and be absorbed partially thereby; causing high shear mixing of the mastic mix by vigorous kneading and working thereof until a desired degree of dispersion and smearing of the pigment particles on the polyvinyl chloride granules is obtained; and heating the mastic mix to a temperature below the melting point of the composition while mixing of the mastic mix until the oil is absorbed by the pigment and the plasticizer is absorbed by both the polyvinyl chloride granules and the pigment, so that particles of the pigment are dispersed upon and are caused to adhere firmly to the irregular surfaces of the polyvinyl chloride granules and the granules become dry and free flowing; the quantity of liquids including the oil and the plasticizer being sufficient to form the mastic mix, the quantity of the oil being less than that which could be absorbed by the pigment, the quantity of the oil and the plasticizer being from approximately 69 percent to approximately 173 percent by weight of the polyvinyl chloride granules and being less than that which could be absorbed by the polyvinyl chloride granules plus the pigment, and the quantity of the pigment being from approximately 41 percent to approximately 273 percent by weight of the polyvinyl chloride granules.

4. The method of making dry, free-flowing, pigmented polyvinyl chloride granular compositions, which comprises forming a stiff mastic mix conducive to internal shearing and working containing polyvinyl chloride granules having irregular surfaces, dry powdered pigment, a liquid organic diluent which will be volatilized at the temperature to which the composition is subjected during the formation thereof, and a liquid solvating plasticizer for the polyvinyl chloride granules, which plasticizer will wet the pigment and be absorbed partially thereby; causing high shear mixing of the mastic mix by vigorous kneading and working thereof until a desired degree of dispersion and smearing of the pigment particles on the polyvinyl chloride granules is obtained; and heating the mastic mix to a temperature below the melting point of the composition while mixing of the mastic mix until the diluent is volatilized and the plasticizer is absorbed by both the polyvinyl chloride granules and the pigment, so that particles of the pigment are dispersed upon and are caused to adhere firmly to the irregular surfaces of the polyvinyl chloride granules and the granules become dry and free flowing; the quantity of liquids including the diluent and the plasticizer being sufficient to form the mastic mix, the quantity of plasticizer being from approximately 69 percent to approximately 100 percent by weight of the polyvinyl chloride granules and being less than that which could be absorbed by the polyvinyl chloride granules plus the pigment, and the quantity of the pigment being from approximately 42 percent to approximately 50 percent by weight of the polyvinyl chloride granules.

5. The method of making dry, free-flowing, pigmented polyvinyl chloride granular compositions, which comprises forming a stiff mastic mix conducive to internal shearing and working containing polyvinyl chloride granules having irregular surfaces, dry powdered pigment, a mineral oil which is not absorbable by the polyvinyl chloride granules but will wet the pigment and be absorbed thereby, a liquid organic diluent which will be volatilized at the temperature to which the composition is subjected during the formation thereof, and a liquid solvating plasticizer for the polyvinyl chloride granules, which plasticizer will wet the pigment and be absorbed partially thereby; causing high shear mixing of the mastic mix by vigorous kneading and working thereof until a desired degree of dispersion and smearing of the pigment particles on the polyvinyl chloride granules is obtained; and heating the mastic mix to a temperature below the melting point of the composition while mixing of the mastic mix until the oil is absorbed by the pigment, the diluent is volatilized and the plasticizer is absorbed by both the polyvinyl chloride granules and the pigment, so that particles of the pigment are dispersed upon and are caused to adhere firmly to the irregular surfaces of the polyvinyl chloride granules and the granules become dry and free flowing; the quantity of liquids including the oil, the diluent and the plasticizer being sufficient to form the mastic mix, the quantity of oil being less than that which could be absorbed by the pigment and the quantity of oil and plasticizer being approximately 69 percent by weight of the polyvinyl chloride granules which is less than that which could be absorbed by the polyvinyl chloride granules plus the pigment, and the quantity of the pigment being approximately 50 percent by weight of the polyvinyl chloride granules.

6. The method of manufacturing a dry, free-flowing dispersed composition of pigment on granules of dry blend polyvinyl chloride resins, which comprises the steps of mixing particles of dry powdered pigment with granules of polyvinyl chloride resin of irregular surfaces; adding a quantity of liquid solvating di(2 ethylhexyl) phthalate plasticizer for the polyvinyl chloride resin, from approximately 69 percent to approximately 150 percent by weight of the polyvinyl chloride granules which is in excess of that which will be absorbed by the polyvinyl chloride resin and sufficient to form a stiff mastic mix conducive to internal shearing and working but less than that which could be absorbed by the polyvinyl chloride resin plus the pigment, to the polyvinyl chloride resin and pigment while mixing the same to form the stiff mastic mix; causing high shear mixing of the mastic mix containing the granules of polyvinyl chloride resin, the pigment and the plasticizer by vigorous kneading and working thereof until the desired degree of dispersion and smearing of the pigment particles on the polyvinyl chloride granules is attained, and heating the mastic mix to a temperature below the melting point thereof for causing the mastic mix to break up into a dry, free-flowing dispersion so that the granules become dry and free flowing, the quantity of pigment being from approximately 41 percent to approximately 273 percent by weight of the polyviny chloride granules.

7. The method of producing a dry, free-flowing, red pigment-coated granular composition of a dry blend polyvinyl chloride resin and a dry powdered red pyrazolone pigment, which comprises mixing and heating dry powdered particles of the red pyrazolone pigment with a light process mineral oil which is not absorbable by polyvinyl chloride resin but will wet the pigment and be absorbed thereby; adding granules having irregular surfaces of the polyvinyl chloride resin of an amount of the order of 47.2% by weight of the finished composition to the pigment and the oil; adding a liquid solvating di(2 ethylhexyl) phthalate plasticizer while mixing and heating the same to a temperature of the order of 125° F. to form a mastic mix; the amount of plasticizer being of the order of 28.2% by weight of the composition, which is in excess of that which will be absorbed completely by the granules of the polyvinyl chloride resin but less than that which could be absorbed by the pigment and the polyvinyl chloride resin; kneading and working the mastic mix to cause internal shearing thereof, and heating the mastic mix to a temperature of approximately 195° F., which is below the melting point thereof, so that the mastic mix will break up and form a free-flowing dispersion and the granules become dry and free flowing, the quantity of oil being of the order of 4.6% by weight of the composition, which is less than that which could be absorbed by the pigment, and the amount of pigment being of the order of 20.0% by weight of the composition.

8. The method of making dry, free-flowing, red pigmented polyvinyl chloride granular compositions, which comprises forming a mastic mix paste with an amount of dry powdered red pyrazolone pigment of the order of 33.0% by weight of the paste and 20.05% by weight of the finished composition, an amount of the order of 12.8% by weight of the paste of liquid aliphatic solvent which will volatilize at a temperature below 200° F., and an amount of liquid solvating butyl benzyl phthalate plasticizer for the polyvinyl chloride which will wet the pigment and be absorbed partially thereby of the order of 54.2% by weight of the paste and 32.85% by weight of the finished composition; adding an amount of the order of 47.1% by weight of the finished composition of polyvinyl chloride resin granules having irregular surfaces; and then kneading and working the mastic mix and heating the mastic mix to a temperature of the order of 200° F., which is below the melting point of the composition, and further kneading and working the mastic mix until the plasticizer is absorbed by both the resin granules and the pigment and the solvent is volatilized, so that particles of the pigment are dispersed upon and are caused to adhere firmly to the surfaces of the polyvinyl chloride resin granules and the granules of polyvinyl chloride resin become dry and free flowing, the quantity of plasticizer being less than that which could be absorbed by the polyvinyl chloride granules plus the pigment.

9. The process of preparing dry, free-flowing, red pigmented dry blend polyvinyl chloride resin granular compositions, which comprises the steps of submitting a dry powdered red pyrazolone pigment together with a light process mineral oil which will not be absorbed by polyvinyl chloride resin but will wet the pigment and be absorbed thereby in an amount of the order of 4.44% by weight of the finished composition to a heating and mixing operation; adding an amount of the order of 45.42% by weight of the finished composition of granules of polyvinyl chloride resin of irregular surfaces and a quantity of liquid solvating di(2 ethylhexyl) phthalate plasticizer for the polyvinyl chloride resin in an amount of the order of 27.14% by weight of the finished composition, which is in excess of that which will be absorbed by the polyvinyl chloride resin but less than that which could be absorbed by the polyvinyl chloride resin plus the pigment, to a further mixing and heating action; adding an amount of the order of 10% by weight of the finished composition of liquid aliphatic solvent, which will be volatilized at a temperature below 200 F., while controlling the temperature thereof until a mastic mix is formed; kneading and working the mastic mix until the desired degree of dispersion is obtained, and heating the mastic mix to a temperature between 175° F. and 200° F., which is above the temperature at which the solvent will be volatilized and below the melting point of the composition, for causing the mastic mix to form a free-flowing dispersion so that the granules are dry and free flowing and at least a portion of the plasticizer is absorbed by the pigment which results in the pigment adhering to the resin to form a coating thereon.

10. The method of manufacturing a dry, free-flowing, beige composition of dispersed pigment on a dry blend polyvinyl chloride granular resin, which comprises the steps of mixing particles of dry powdered titanium dioxide, iron oxide red and channel black pigments with a light process mineral oil which is not absorbed by polyvinyl chloride resin but will wet the pigments and be absorbed thereby; adding granules of polyvinyl chloride resin of irregular surfaces in an amount of the order of 18.33% by weight of the finished composition thereto; mixing the pigment, the oil and the polyvinyl chloride resin; adding a quantity of liquid solvating di(2 ethylhexyl) phthalate plasticizer for the resin of the order of 20.42% by weight of the finished composition, which is in excess of that which will be absorbed by the polyvinyl chloride resin but less than that which could be absorbed by the polyvinyl chloride resin plus the pigment, to the mixture of pigment, oil and polyvinyl chloride resin; mixing and heating the mixture of pigment, oil, resin and plasticizer to a temperature of the order of 125° F. until a mastic mix is formed; kneading and working the mastic mix until a desired degree of dispersion is obtained, and heating the mastic mix to a temperature between 175° F. and 200° F., which is below the melting point of the composition, for causing the mastic mix to form a dry free-flowing dispersion and the granules to become dry and free flowing, so that a major portion of the plasticizer is absorbed by the resin, and the pigment adheres to the resin to form a coating thereon, the quantity of oil being of the order of 11.25% by weight of the finished composition which is less than that which could be absorbed by the pigment, and the amounts of titanium dioxide, iron oxide red and channel black pigments being, respectively, of the order of 33.46%, 15.63% and 0.91% by weight of the finished composition.

References Cited in the file of this patent

UNITED STATES PATENTS

| | | |
|---|---|---|
| 2,244,020 | Patton | June 3, 1941 |
| 2,431,078 | Powell et al. | Nov. 18, 1947 |
| 2,447,398 | Supinski | Aug. 17, 1948 |
| 2,530,852 | Bixby | Nov. 21, 1950 |

FOREIGN PATENTS

| | | |
|---|---|---|
| 509,337 | Canada | Jan. 18, 1955 |

OTHER REFERENCES

Modern Plastics, August, 1954, pages 104–105.